(12) United States Patent
Shibukawa et al.

(10) Patent No.: US 8,096,910 B2
(45) Date of Patent: Jan. 17, 2012

(54) TRAVEL ASSEMBLY FOR DUMP TRUCK

(75) Inventors: Takeshi Shibukawa, Tsuchiura (JP); Hayato Masuda, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 433 days.

(21) Appl. No.: 12/481,902

(22) Filed: Jun. 10, 2009

(65) Prior Publication Data
US 2009/0312135 A1 Dec. 17, 2009

(30) Foreign Application Priority Data
Jun. 12, 2008 (JP) ................................. 2008-154276

(51) Int. Cl.
*F16H 57/04* (2010.01)
(52) U.S. Cl. ....................................................... 475/159
(58) Field of Classification Search .................. 475/159, 475/160, 331
See application file for complete search history.

(56) References Cited

U.S. PATENT DOCUMENTS

| 6,223,616 | B1 * | 5/2001 | Sheridan ......................... 74/468 |
| 7,404,779 | B2 * | 7/2008 | Eckert ............................ 475/159 |
| 7,604,558 | B2 * | 10/2009 | Okada et al. ................... 475/159 |
| 7,819,214 | B2 * | 10/2010 | Mizutani et al. ........... 180/65.51 |
| 8,016,707 | B2 * | 9/2011 | Eckert ............................ 475/159 |
| 2005/0059523 | A1 | 3/2005 | Hasegawa et al. |

* cited by examiner

*Primary Examiner* — Ha D. Ho
(74) *Attorney, Agent, or Firm* — Crowell & Moring LLP

(57) ABSTRACT

Wheels of a dump truck are each provided with a travel assembly for transmitting an output of an electric motor to the wheel via a reduction gear unit. The travel assembly is provided with a cooling circuit for cooling lube oil. The cooling circuit has an oil cooler and a recovery oil passage for guiding lube oil from a side of the gear unit to the cooler. The recovery oil passage has an intra-spindle recovery line inserted on a side of an inner periphery of a spindle, a suction pipe extending from the recovery line to a space surrounded by the spindle, the wheel and two spindle-supporting bearings, and communication holes formed in the wheel to communicate the side of the reduction gear unit with the space.

2 Claims, 6 Drawing Sheets

TRAVEL ASSEMBLY FOR DUMP TRUCK

CROSS-REFERENCE TO RELATED APPLICATION

This application claims the priority of Japanese Patent Application 2008-154276 filed Jun. 12, 2008, which is incorporated herein by reference.

BACKGROUND OF THE INVENTION

1. Field of the Invention

This invention relates to a travel assembly for a dump truck, which serves to transmit an output of its corresponding electric motor to an associated wheel by way of a reduction gear unit such that the dump truck is allowed to travel.

2. Description of the Related Art

As travel assemblies for dump trucks, there are those which transmit an output of a diesel engine to a tire wheel by using a differential and those which drive an electric motor with electric power generated by a diesel engine and transmit an output of the electric motor to a tire wheel by a reduction gear unit including a planetary gear mechanism. Dump trucks include large ones having payload capacity of greater than 100 tons and employed in mines. As travel assemblies for driving such large dump trucks, travel assemblies of the latter type tend to be adopted for the reason that their structures facilitate the availability of strength.

With reference to FIGS. 1 to 3, a description will be made about conventional travel assemblies of the latter type for a dump truck. FIG. 1 is a left side view of the dump truck. FIG. 2 is a rear view of the dump truck. FIG. 3 is a cross-sectional view showing a spindle and a reduction gear unit in one of the conventional travel assemblies for the dump truck.

As shown in FIGS. 1 and 2, the dump truck 1 has a chassis 2 as its main body, a vessel 3 tiltably mounted on the chassis 2, and front wheels 4 and rear wheels 5 supporting thereon the chassis 2 for traveling. The left and right, rear wheels 5 are both provided with the conventional dump-truck travel assemblies, respectively, whereby the rear wheels 5 can be driven. Numeral 8 in FIG. 2 designates electric motors in the conventional travel assemblies. The electric motors 8 are arranged with their output shafts inserted from inner sides of the respective rear wheels 5 as viewed in a transverse direction of the chassis 2.

As depicted in FIG. 3, each rear wheel 5 is comprised of a wheel 9 and tires 6, 7 mounted as double tires on the wheel 9.

Also referring to FIG. 3, the conventional travel assembly also has, in addition to the above-described wheel 9, a spindle 10 non-rotatably fixed on the chassis 2 and inserted on a side of an inner periphery of the wheel 9, and two bearings 11, 12 arranged side by side in an axial direction between the wheel 9 and the spindle 10. Further, the conventional travel assembly also has the electric motor 8 arranged on a side of an axial one end of the spindle 10 and fixedly secured relative to the chassis 2, a drive shaft 13 non-rotatably connected to the output shaft (not shown) of the electric motor 8, inserted on a side of an inner periphery of the spindle 10 and extending out from an axial opposite end of the spindle 10, and a reduction gear unit 14 arranged on a side of the opposite end of the spindle 10 to transmit power from the drive shaft 13 to the wheel 9.

The reduction gear unit 14 is in a state of immersion in lube oil. The spindle 10 is provided with an oil inlet hole 10a formed to guide lube oil, which has flowed into the spindle 10, into a space surrounded by the spindle 10, the wheel 9 and the two bearings 11, 12. It is to be noted that in FIG. 3, sign "L" indicates a level of lube oil when the rear wheel 5 is in a stopped state.

For related art of this kind, reference may be had to U.S. Patent Application Publication No. 2005/0059523 (FIG. 2).

In the travel assembly, the lube oil for the reduction gear assembly may produce heat and undergo overheating by agitation resistance during travel of the dump truck. This overheating deteriorates the lubrication performance of the lube oil. This deterioration in lubrication performance may become a cause of malfunction or seizure of the reduction gear unit.

SUMMARY OF THE INVENTION

The present invention has been made in view of the above-mentioned circumstance, and its object is to make it possible to cool lube oil for a reduction gear unit in a travel assembly for a dump truck during travel of the dump truck. The travel assembly serves to transmit an output of an electric motor to a wheel via the reduction gear unit.

To achieve the above-mentioned object, the present invention provides in one aspect thereof a travel assembly for a dump truck, said travel assembly having a wheel on which a tire is to be mounted, a spindle inserted on a side of an inner periphery of the wheel, two bearings arranged side by side in an axial direction between the wheel and the spindle, an electric motor arranged on a side of an axial one end of the spindle, a drive shaft non-rotatably connected to an output shaft of the electric motor, inserted on a side of an inner periphery of the spindle and extending out from an axial opposite end of the spindle, and a reduction gear unit arranged on a side of the opposite end of the spindle to transmit power from the drive shaft to the wheel, said reduction gear unit being in a state of immersion in lube oil, and said spindle being provided with an oil inlet hole formed to guide lube oil, which has flowed onto the side of the inner periphery of the spindle, into a first space surrounded by the spindle, the wheel and the two bearings, wherein the travel assembly is provided with a cooling circuit for cooling lube oil, and the cooling circuit has an oil cooler and a recovery oil passage for guiding lube oil from a second space on a side of the reduction gear unit to the oil cooler such that lube oil can be circulated between the cooler and the reduction gear unit; and the recovery oil passage has an intra-spindle recovery line inserted on the side of the inner periphery of the spindle, a suction pipe extending from an end portion of the intra-spindle recovery line, said end portion being on a side opposite to a side of the oil cooler, and through the oil inlet hole and being open in the first space, and communication holes formed in the wheel to communicate the first space and the second space with each other.

As the present invention constructed as described above circulates lube oil for the reduction gear unit between the reduction gear unit and the oil cooler through the cooling circuit, the lube oil can be cooled during travel of the dump truck.

Further, the cooled lube oil is supplied to the reduction gear unit. It is, therefore, unnecessary to rely upon the amount of lube oil to compensate for a deterioration in the lubrication performance of lube oil. This has made it possible to lower the height of the level of lube oil relative to the reduction gear unit, in other words, to reduce the amount of lube oil to be used for the lubrication of the reduction gear unit.

Preferably, the suction pipe in the recovery oil passage may be open on a side of an outer periphery of the spindle at a location radially outer than the two bearings, and the communication holes are formed through the wheel. This preferred embodiment can facilitate the effective recovery of lube oil even when the height of oil level becomes lower under centrifugal force and inertia force.

Moreover, the suction pipe extends through the oil inlet hole, in other words, the oil inlet hole also serves as a hole, through which the suction pipe extends, in addition to its primary function. The present invention, therefore, can contribute to a reduction in the machining man-hour for the arrangement of the recovery oil passage.

As mentioned above, the present invention circulates lube oil for the reduction gear unit between the reduction gear unit and the oil cooler through the cooling circuit so that the lube oil can be cooled during travel of the dump truck. The present invention can, therefore, contribute to the prevention of malfunction or seizure of the reduction gear unit.

DETAILED DESCRIPTION OF PREFERRED EMBODIMENT

Figure 1:
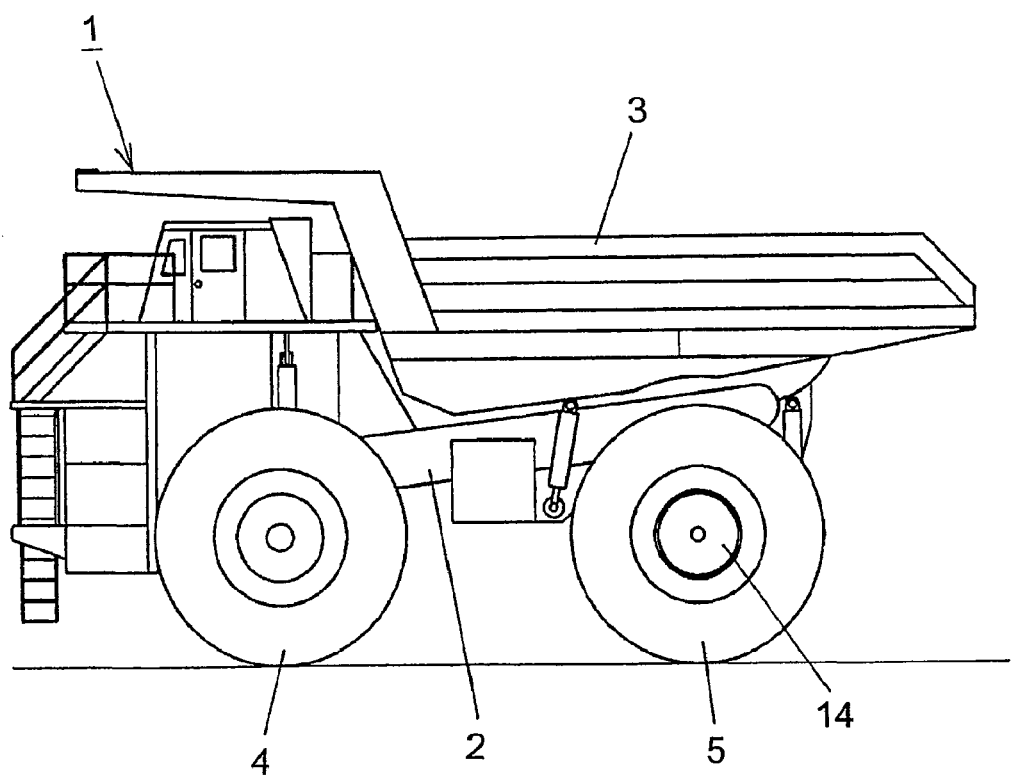
FIG. 1 is a left side view of a dump truck on which the travel assembly according to the present invention can be mounted.
Figure 2:
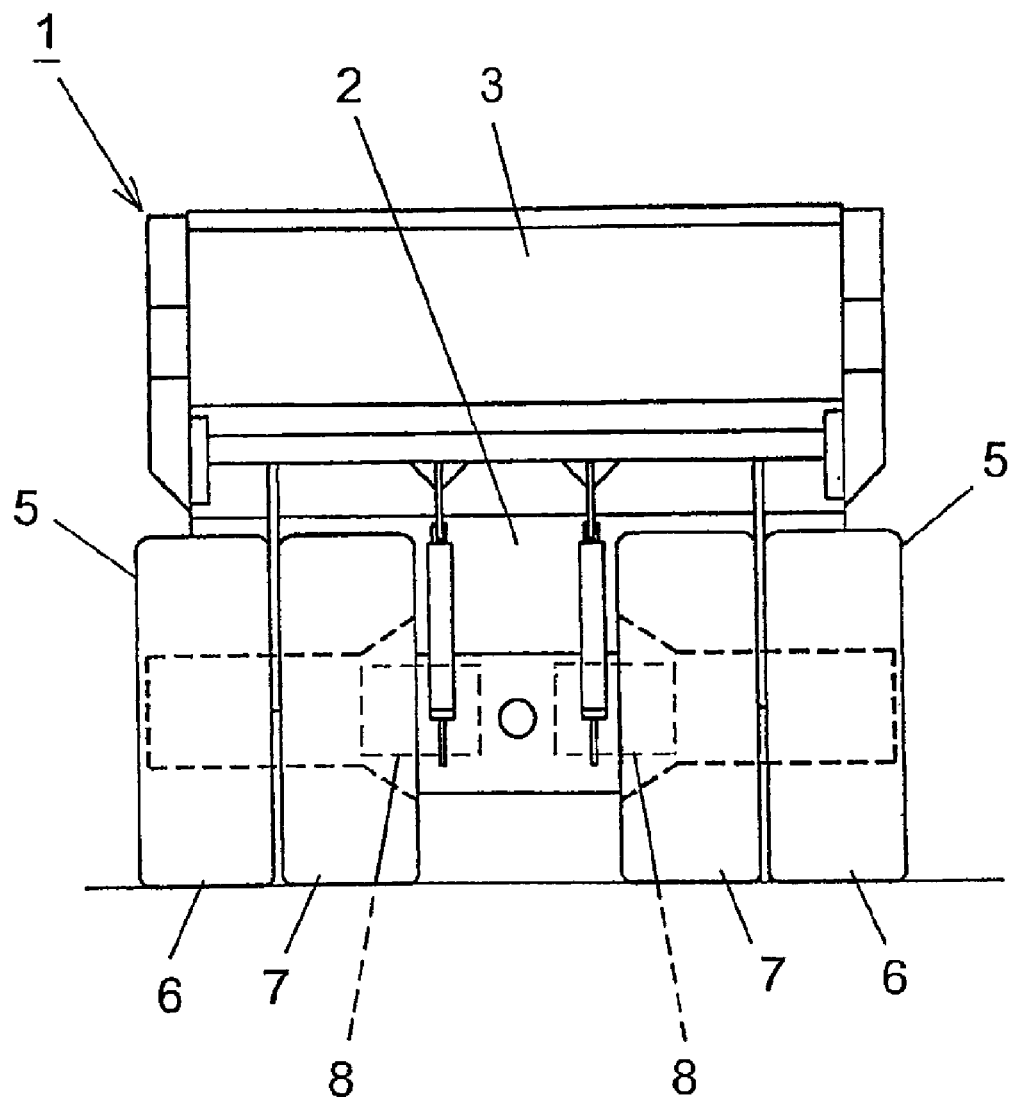
FIG. 2 is a rear view of the dump truck of FIG. 1.
Figure 4:
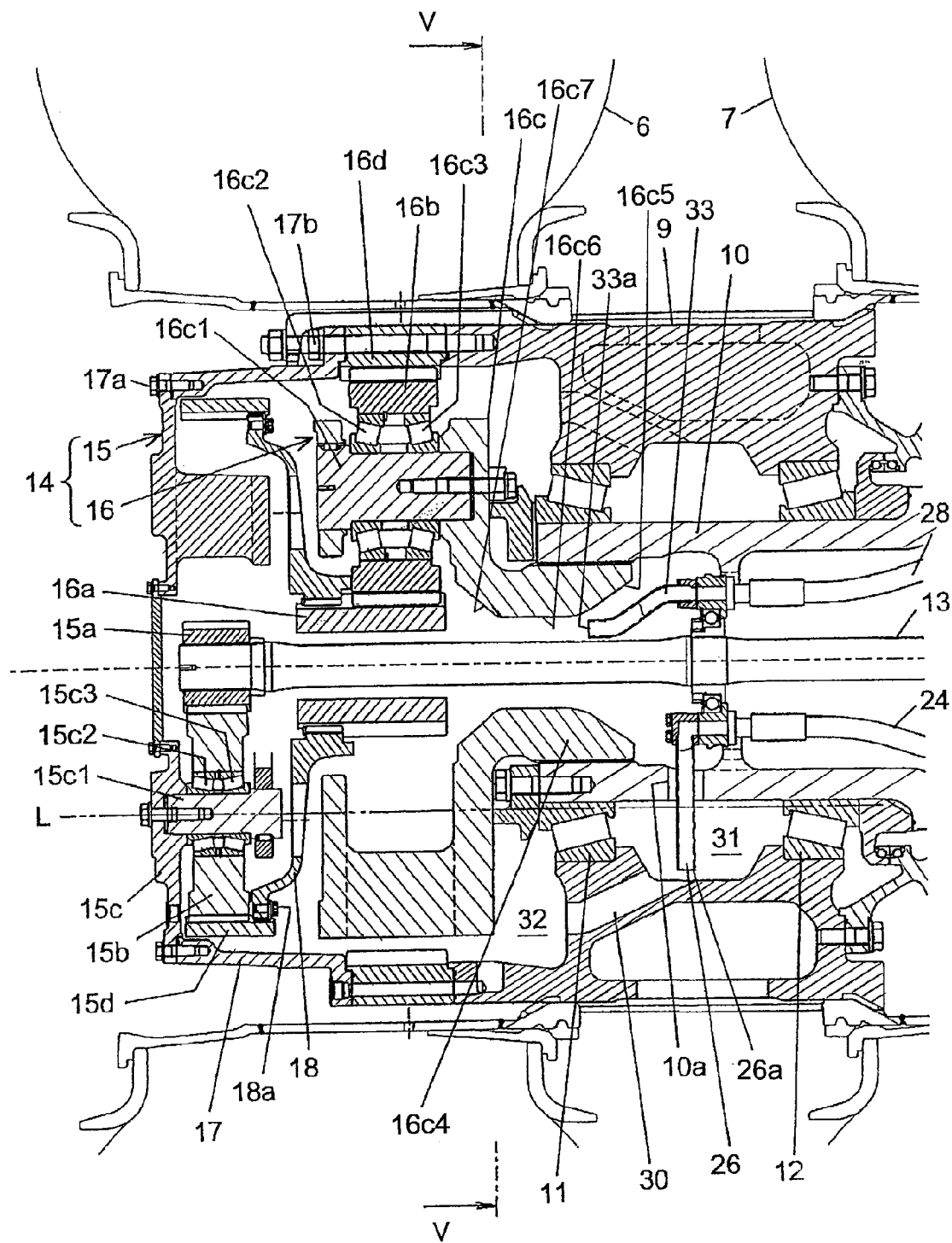
FIG. 4 is a fragmentary cross-sectional view of a travel assembly according to one embodiment of the present invention for the dump truck of FIG. 1, and depicts on an enlarged scale a spindle and a reduction gear unit in the travel assembly.
Figure 5:
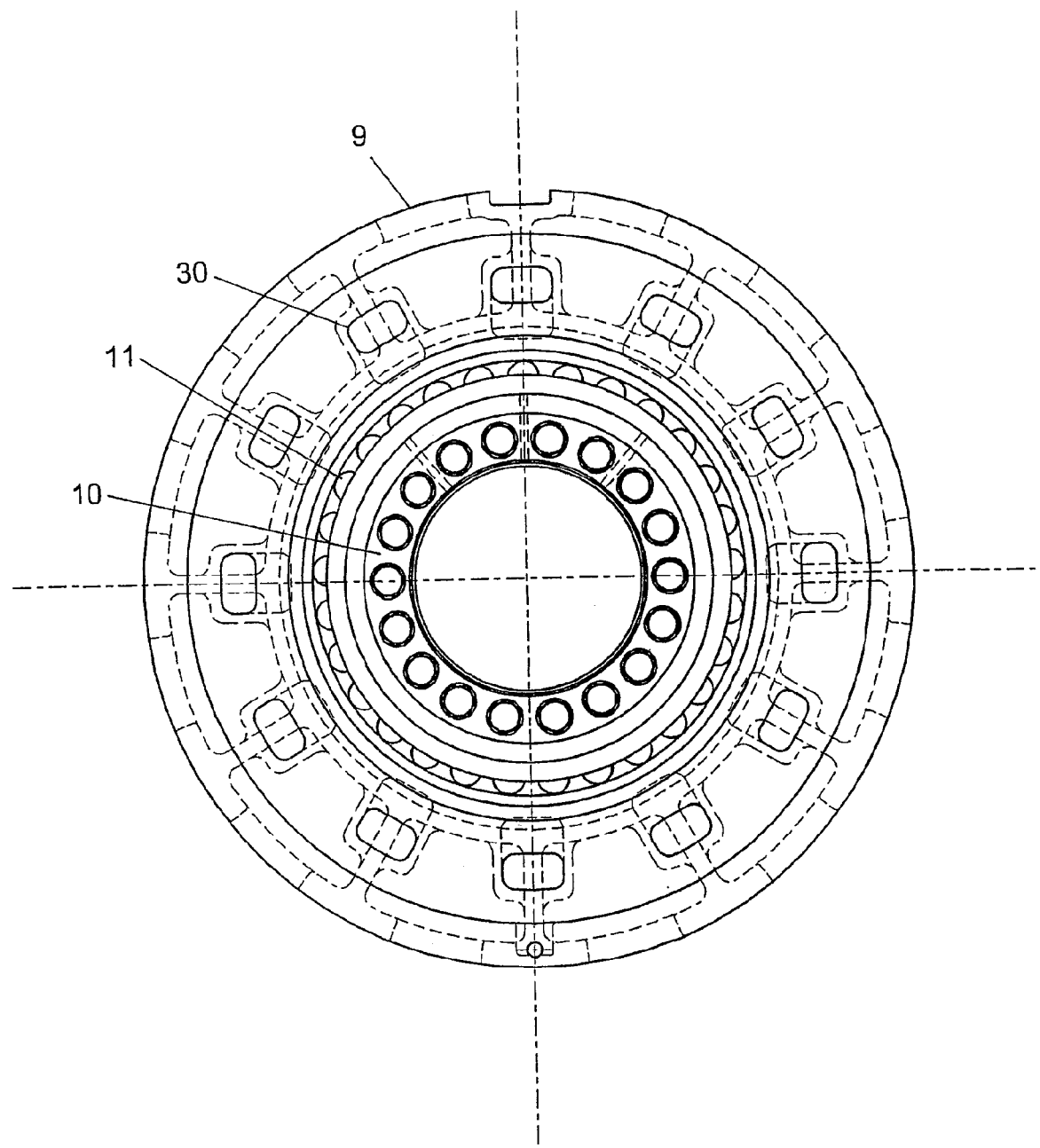
FIG. 5 is a cross-sectional view taken in direction of arrows V-V of FIG. 4, and shows the spindle, a bearing and a wheel.
Figure 6:
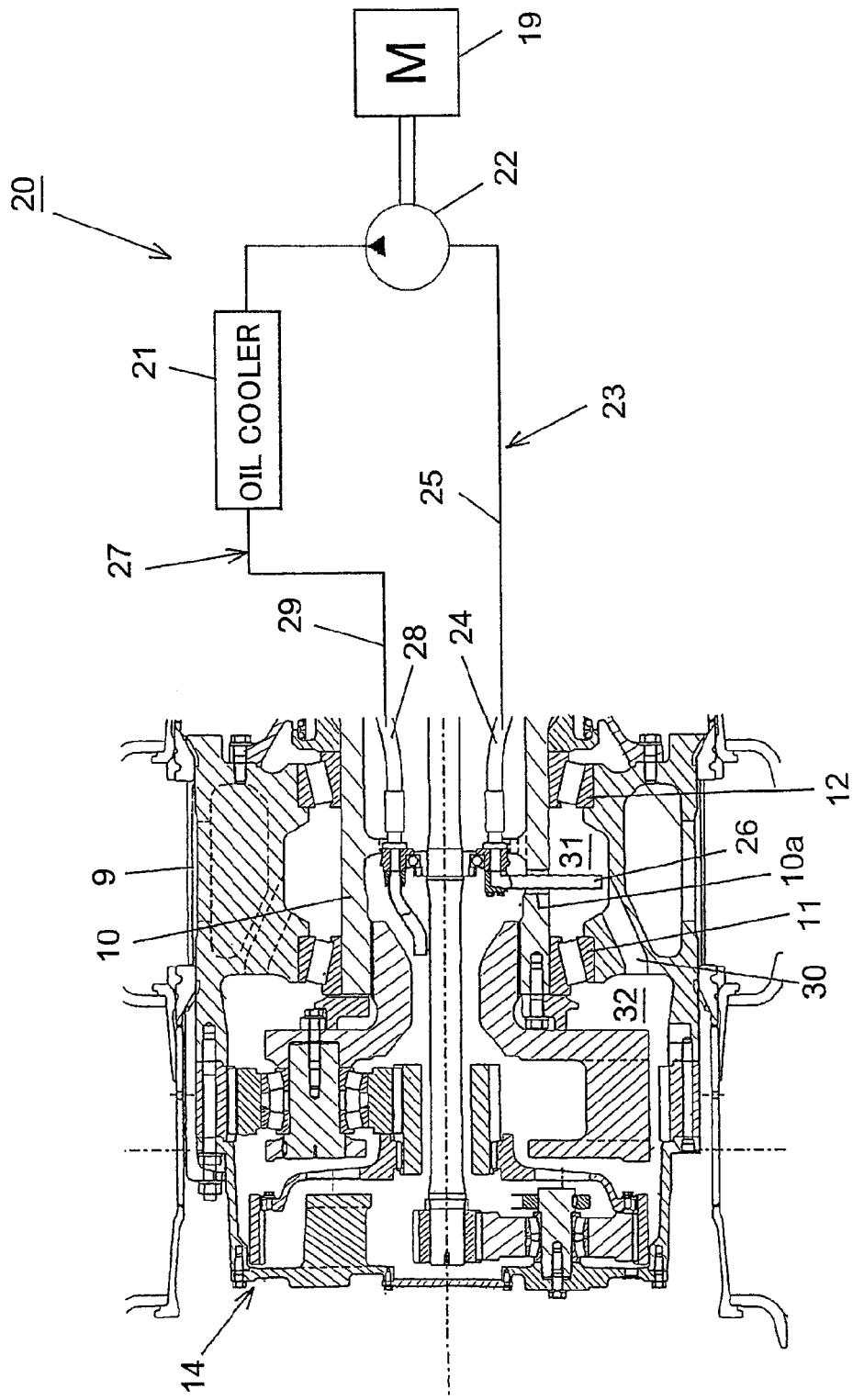
FIG. 6 is a hydraulic circuit diagram illustrating a cooling circuit arranged in the travel assembly according to the one embodiment of the present invention for the dump truck of FIG. 1

With reference to FIGS. 4 through 6, a description will hereinafter be made about a travel assembly according to one embodiment of the present invention for a dump truck. Similar to the above-described conventional travel assembly for the dump truck, the travel assembly according to the one embodiment of the present invention can also be arranged on the dump truck 1 shown in FIGS. 1 and 2.

Figure 3:
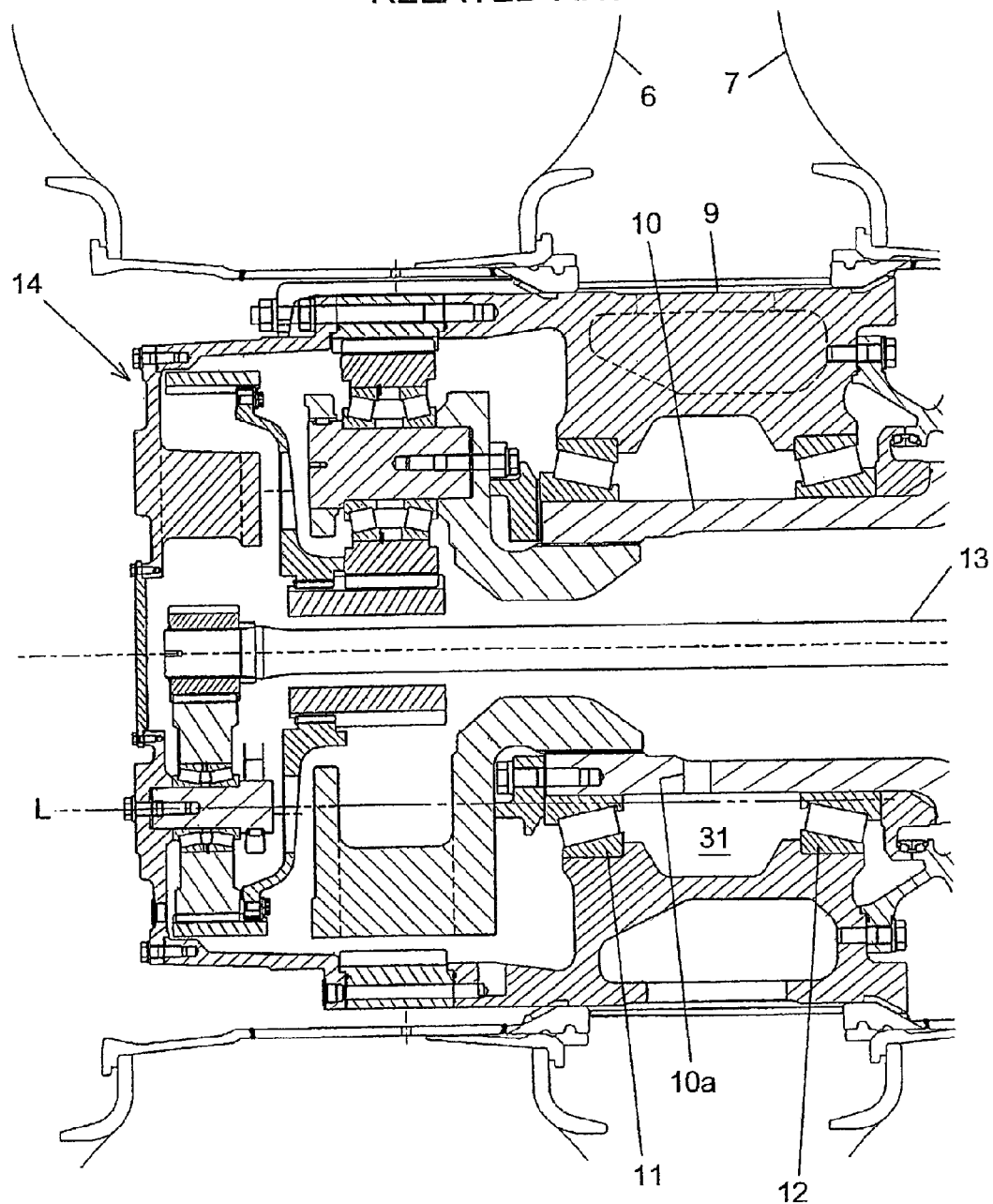
FIG. 3 is a fragmentary cross-sectional view of a conventional travel assembly for the dump truck of FIG. 1, and illustrates a spindle and a reduction gear unit in the conventional travel assembly.

Among the elements of structure depicted in FIG. 4, like elements to those illustrated in FIG. 3 are designated by like reference numerals, and such like elements will also be described again below.

As depicted in FIG. 4, the travel assembly according to this embodiment has, like the conventional travel assembly, the wheel 9 on which the tires 6, 7 are to be mounted as double tires, the spindle 10 non-rotatably fixed on the chassis 2 (see FIG. 2) in the state that the spindle 10 is inserted on the side of the inner periphery of the wheel 9, and the two bearings 11, 12 arranged side by side in the axial direction between the wheel 9 and the spindle 10. Further, the travel assembly according to this embodiment also has the electric motor 8 (see FIG. 2) arranged on the side of the axial one end of the spindle 10 and fixedly secured relative to the chassis 2, the drive shaft 13 non-rotatably connected to the output shaft (not shown) of the electric motor 8, inserted on the side of the inner periphery of the spindle 10 and extending out from the axial opposite end of the spindle 10, and the reduction gear unit 14 arranged on the side of the opposite end of the spindle 10 to transmit power from the drive shaft 13 to the wheel 9.

The reduction gear unit 14 is provided with a first planetary gear mechanism 15 and a second planetary gear mechanism 16. The first planetary gear mechanism 15 is arranged more remote from the spindle 10 than the second planetary gear mechanism 16. This first planetary gear mechanism 15 includes: a first sun gear 15a non-rotatably fixed on an end portion of the drive shaft 13, said end portion extending out from the opposite end of the spindle 10; plural first planetary gears 15b arranged in meshing engagement with the first sun gear 15a (note: only one planetary gear is shown); a first carrier 15c on which plural spindles 15c1 are arranged while rotatably supporting thereon the first planetary gears 15b, respectively, via two bearings 15c2, 15c3 (note: only one spindle is shown); and a first ring gear 15d arranged in meshing engagement with the plural first planetary gears 15b.

The first carrier 15c is non-rotatably fixed relative to a hub 17, a second ring gear 16d, which is to be described subsequently herein, and a wheel 9 by bolts 17a, 17b. On a first ring gear 15d, a coupling 18 is fixed by bolts 18a.

The second planetary bear mechanism 16 includes: a second sun gear 16a splined to the coupling 18; plural secondary planetary gears 16b arranged in meshing engagement with the second sun gear 16a (note: only one secondary planetary gear is shown); a second carrier 16c on which plural spindles 16c1 are arranged while rotatably supporting thereon the second planetary gears 16b, respectively, via two bearings 16c2, 16c3 (note: only one spindle is shown); and a second ring gear 16d arranged in meshing engagement with the plural second planetary gears 16b.

The second carrier 16c is provided with a cylindrical extension 16c4, which is formed at a radially inner location than the plural spindles 16c1 and extends toward the spindle 10. This cylindrical extension 16c4 is inserted on the side of the inner periphery of the spindle 10 and is splined to the spindle 10. On the other hand, the second ring gear 16d is fastened and fixed together with the hub 17 on the wheel 9 by the bolts 17b. The first carrier 15c, hub 17 and second ring gear 16d constitutes a cover that covers the reduction gear units 14 on the side of the opposite end of the spindle 10.

Lube oil is used for the reduction gear unit 14. The spindle 10 is provided with an oil inlet hole 10a to guide lube oil, which has flowed into the spindle 10, to a space 31 surrounded by the spindle 10, wheel 9 and two bearings 11, 12. It is to be noted that in FIG. 4, sign "L" indicates the height of the level of lube oil when the rear wheel 5 is in a stopped state.

The reduction gear unit 14 constructed as described above operates as will be described next.

In the first planetary gear mechanism 15, the first sun gear 15a rotates together with the drive shaft 13. The rotation of the first sun gear 15a is transmitted to the first planetary gears 15b. As the first carrier 15c with the first planetary gears 15b supported thereon is fixed non-rotatably relative to the wheel 9, the first planetary gears 15b rotate on their axes, respectively, while revolving around the first sun gear 15a, and transmit the rotation of the first sun gear 15a to the first ring gear 15d. As a result, the first ring gear 15d rotates.

When the first ring gear 15d rotates as described above, the second sun gear 16a rotates together with the first ring gear 15d and coupling 18 in the second planetary gear mechanism 16. The rotation of the second sun gear 16a is transmitted to the plural second planetary gears 16b. As the second carrier 16c with the second planetary gears 16b supported thereon is connected non-rotatably to the spindle 10, the second planetary gears 16b rotate on their axes, respectively, without revolving around the second sun gear 16a, and transmits the rotation of the second sun gear 16a to the second ring gear 16d. The second ring gear 16d is fixed non-rotatably relative to the wheel 9 and first carrier 15c, and therefore, rotates together with these wheel 9 and first carrier 15c.

As a result of the transmission of the rotation of t he drive shaft 13 to the wheel 9 via the first planetary gear mechanism 15 and second planetary gear mechanism 16 as described above, the rear wheel 5 of the dump truck 1 is driven.

A description will next be made about characteristic features of the travel assembly according to this embodiment.

The travel assembly according to this embodiment is characterized in that as illustrated in FIG. 6, it includes an oil cooler 21 and a cooling circuit 20 for circulating lube oil between the oil cooler 21 and the reduction gear unit 4. This cooling circuit 20 includes: a recovery oil passage 23 for recovering lube oil from the side of the reduction gear 14 and guiding it to the oil cooler 21; a re-supply oil passage 27 for guiding the lube oil, which has been cooled by the oil cooler 21, to the reduction gear mechanism 14 from the side of the inner periphery of the spindle 10; and a pump 22 drivable by a diesel engine 19 to product a flow of lube oil for its circulation through the cooling circuit 20. It is to be noted that the diesel engine 19 drives an unillustrated power generator in addition to the pump 22 and electric power is supplied from the power generator to the electric motor 8 to operate the electric motor 8.

The recovery oil passage 23 is comprised of an intra-spindle recovery line 24 inserted on the side of the inner periphery of the spindle 10; an extra-spindle recovery line 25 connecting the intra-spindle recovery line 24 and the oil cooler 21 with each other and provided with the pump 22 arranged therein; and a suction pipe 26 connected to an end portion of the intra-spindle recovery line 24, said end portion being on a side opposite to the oil cooler 21. This suction pipe 26 extends through the oil inlet hole 10a to a location radially outer than the two bearings 11, 12 on the side of the outer periphery of the spindle 10. The recovery oil passage 23 is also comprised of communication holes 30 through which a space 32 on the side of the reduction gear unit 14 and a space 32 between the two bearings 11, 12 are communicated to each other. These communication holes 30 are formed through a section of the wheel 9, said section being located on the side of the outer peripheries of the two bearings 11, 12.

During travel of the dump truck 1, the height of the oil level becomes lower than the height L of the oil level depicted in FIG. 4 because centrifugal force and inertia force are applied to the lube oil. The location of a free end portion of the suction pipe 26, that is, a suction opening 26a is, therefore, set lower than the height of the level of the lube oil during travel of the dump truck 1. In other words, the suction pipe 26 is open at a location lower than the height of the level of the lube oil during travel of the dump truck 1.

The re-supply oil passage 27 has an intra-spindle re-supply line 28 inserted to the side of the inner periphery of the spindle 10 and an extra-spindle re-supply line 29 connecting the intra-spindle re-supply line 28 and the oil cooler with each other. An end portion of the intra-spindle re-supply line 28, said end portion being on a side opposite to the oil cooler 21, is connected to a discharge pipe 33. This discharge pipe 33 is inserted in the cylindrical extension 16c4 of the second carrier 16c.

An inner wall of the cylindrical extension 16c4 is comprised of a first frusto-conical wall portion 16c5 tapered in a direction toward a free end portion of the discharge pipe 33, that is, a discharge opening 33a, a cylindrical wall portion 16c6 extending in a direction from the first frusto-conical wall portion 16c5 toward the second sun gear 16a, and a second frusto-conical wall portion 16c7 flared in a direction from the cylindrical wall portion 16c6 toward the second planetary gear mechanism 16. The discharge opening 33a of the discharge pipe 33 is located facing the cylindrical wall portion 16c6. This construction facilitates the guidance of the lube oil to the reduction gear unit 14 after its delivery from the discharge opening 33a.

The cooling circuit 20 constructed as described above operates as will be described next.

During travel of the dump truck 1, the pump 22 is driven by the diesel engine 19 while electric power generated by the diesel engine 19 is supplied to the electric motor 8. As a result of the drive of the pump 22, the lube oil accumulated within the space between the two bearings 11, 12 is drawn up through the suction pipe 26, is guided to the oil cooler 21 through the intra-spindle recovery line 24 and extra-spindle recovery line 25, and is then cooled there. Subsequently, the cooled lube oil is delivered from the oil cooler 21 through the extra-spindle re-supply line 29 and intra-spindle re-supply line 28, and is then re-supplied to the reduction gear unit 14 from the cylindrical extension 16c4 formed on the second carrier 16c in the second planetary gear mechanism 16.

As the space 32 on the side of the reduction gear mechanism 14 is in communication with the space 31 between the two bearings 11, 12 through the communication holes 30, a portion of the lube oil supplied to the reduction gear unit 14 is guided to the space 31 and is drawn up again through the suction pipe 26. As described above, the lube oil in the reduction gear unit 14 is caused to circulate between the reduction gear unit 14 and the oil cooler 21 during operation of the diesel engine 19, that is, during travel of the dump truck 1.

According to the travel assembly of this embodiment, the following advantageous effects can be brought about.

The drive assembly of this embodiment circulates lube oil for the reduction gear unit 14 between the reduction gear unit 14 and the oil cooler 21 through the cooling circuit so that the lube oil can be cooled during travel of the dump truck 1. The drive assembly can, therefore, contribute to the prevention of malfunction or seizure of the reduction gear unit 14.

The drive assembly of this embodiment supplies the cooled lube oil to the reduction gear unit 14. It is, therefore, unnecessary to rely upon the amount of lube oil to compensate for a deterioration in the lubrication performance of lube oil. This has made it possible to lower the height of the level of lube oil relative to the reduction gear unit 14, in other words, to reduce the amount of lube oil to be used for the lubrication of the reduction gear unit 14.

According to the drive assembly of this embodiment, the suction pipe 26 in the recovery oil passage 23 is open on the side of the outer periphery of the spindle 10 at a location radially outer than the two bearings 11, 12, and the communication holes 30 are formed through the wheel 9. Accordingly, the recovery of lube oil can be conducted effectively.

According to the drive assembly of this embodiment, the suction pipe 26 extends through the oil inlet hole 10a, in other words, the oil inlet hole 10a also serves as a hole, through which the suction pipe 26 extends, in addition to its primary function. The drive assembly, therefore, can contribute to a reduction in the machining man-hour for the arrangement of the recovery oil passage 23.

The invention claimed is:

1. A travel assembly for a dump truck, said travel assembly having a wheel on which a tire is to be mounted, a spindle inserted on a side of an inner periphery of said wheel, two bearings arranged side by side in an axial direction between said wheel and said spindle, an electric motor arranged on a side of an axial one end of said spindle, a drive shaft non-rotatably connected to an output shaft of said electric motor, inserted on a side of an inner periphery of said spindle and extending out from an axial opposite end of said spindle, and a reduction gear unit arranged on a side of the opposite end of said spindle to transmit power from said drive shaft to said wheel, said reduction gear unit being in a state of immersion in lube oil, and said spindle being provided with an oil inlet hole formed to guide lube oil, which has flowed onto the side of the inner periphery of said spindle, into a first space surrounded by said spindle, said wheel and said two bearings, wherein:

said travel assembly is provided with a cooling circuit for cooling lube oil, and said cooling circuit has an oil cooler and a recovery oil passage for guiding lube oil from a second space on a side of said reduction gear unit to said oil cooler such that lube oil can be circulated between said cooler and said reduction gear unit; and said recovery oil passage has an intra-spindle recovery line inserted on the side of the inner periphery of said spindle, a suction pipe extending from an end portion of said intra-spindle recovery line, said end portion being on a side opposite to a side of said oil cooler, and through said oil inlet hole and being open in said first space, and communication holes formed in said wheel to communicate said first space and said second space with each other.

2. The travel assembly according to claim 1, wherein said suction pipe is open at a location lower than a height of a level of the lube oil during travel of said dump truck.

* * * * *